A. TIBBS.
AUTOMATIC THERMAL CUT-OFF FOR GAS BURNERS.
APPLICATION FILED JULY 24, 1913.
1,082,712.
Patented Dec. 30, 1913.
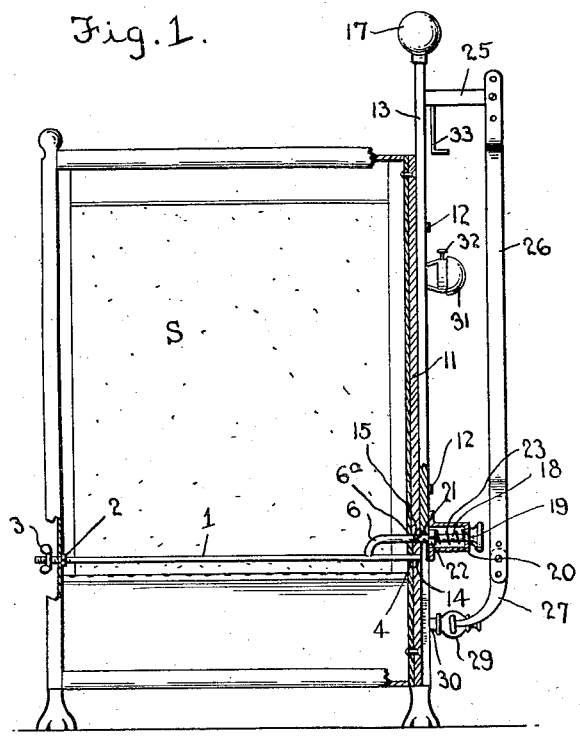
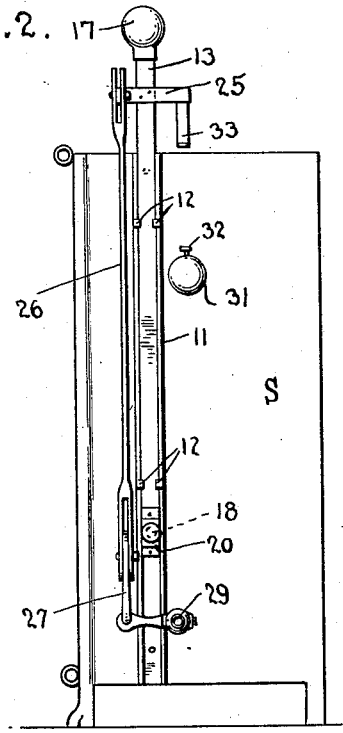
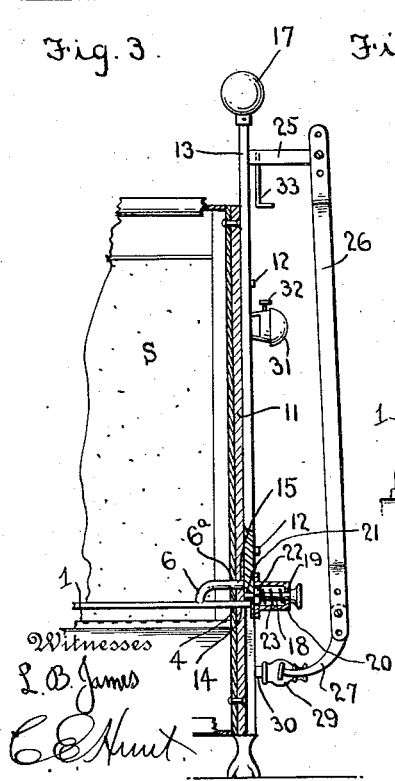
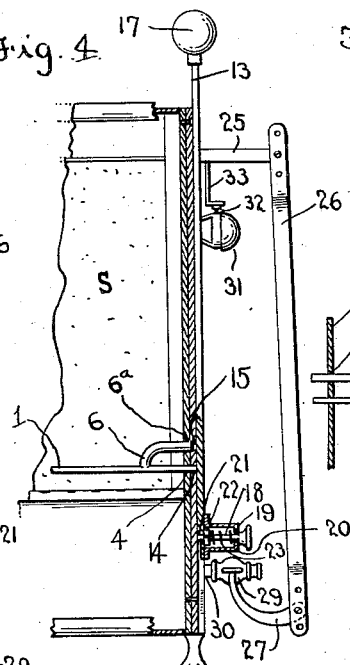
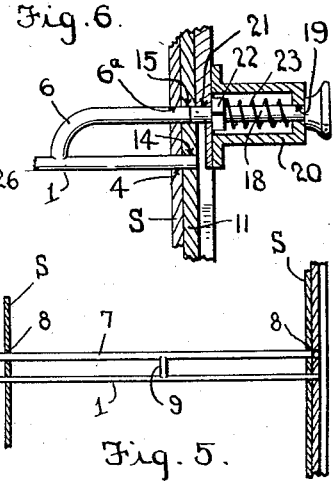
Inventor
Angus Tibbs

UNITED STATES PATENT OFFICE.

ANGUS TIBBS, OF UNIONTOWN, PENNSYLVANIA, ASSIGNOR OF ONE-HALF TO JOHN FOSTER PAGE AND ONE-FOURTH TO WILLIAM P. HENDERSON, BOTH OF UNIONTOWN, PENNSYLVANIA.

AUTOMATIC THERMAL CUT-OFF FOR GAS-BURNERS.

1,082,712.  Specification of Letters Patent.  Patented Dec. 30, 1913.

Application filed July 24, 1913. Serial No. 781,013.

*To all whom it may concern:*

Be it known that I, ANGUS TIBBS, a citizen of the United States, residing at Uniontown, in the county of Fayette and State of Pennsylvania, have invented certain new and useful Improvements in Automatic Thermal Cut-Offs for Gas-Burners; and I do declare the following to be a full, clear, and exact description of the invention, such as will enable others skilled in the art to which it appertains to make and use the same.

This invention relates to improvements in automatic thermal cut offs for burners and particularly to means for automatically setting the cut off.

One object of the invention is to improve the thermal cut off shown and described in the U. S. Patent Number 1,055,955, granted to me March 11, 1913, whereby the same will automatically set itself after the burner has been lighted thus obviating the necessity of waiting for the thermal bar of the device to expand before the cut off mechanism can be set.

With this and other objects in view, the invention consists of certain novel features of construction, combination and arrangement of parts as will be more fully described and claimed.

In the accompanying drawings: Figure 1 is a front view of a gas heating stove showing the application of the invention, parts being broken away and in section and illustrating the cut off mechanism in an inoperative position or before being set. Fig. 2 is a side view of the stove with the parts in the position shown in Fig. 1. Fig. 3 is a vertical section through a portion of a stove showing the cut off mechanism after being automatically set. Fig. 4 is a similar view showing the cut off mechanism in operative position and the valve of the burner closed. Fig. 5 is a detail front view of a portion of the stove showing slightly modified arrangement of the thermal bar and releasing mechanism. Fig. 6 is an enlarged detail vertical sectional view of a portion of the stove and the cut off mechanism illustrating the parts in the position shown in Fig. 1.

My improved thermal cut off and automatic setting mechanism may be applied to any form of gas burner for automatically closing the supply valve thereof should the flame become extinguished from any cause. In the present instance the cut off is shown applied to the burner and supply pipe of a gas heating stove S and comprises a thermal or longitudinally expansible bar 1 which is arranged a suitable distance above the burner and may be supported in any suitable manner, said bar being here shown as having one end threaded and projecting through one side of the stove. On the threaded end of the bar adjacent to the inner side of the stove is screwed a stop nut 2 while on the outer threaded end of the bar is screwed a thumb nut 3 which is adapted to be screwed up against the outer side of the stove thus together with the stop nut 2 rigidly fastening this end of the thermal bar. The opposite end of the bar has a loose sliding engagement with an aperture 4 formed in the opposite side of the stove.

Arranged above the thermal bar 1 and spaced a suitable distance therefrom, is a catch releasing mechanism which is preferably in the form of a finger 6 arranged above and parallel with the free end of the bar 1 and which has its inner end bent inwardly and connected with or rigidly secured to said bar 1 as shown in the first figures of the drawings. The free end of the finger 6 is engaged with an aperture 6ª formed in the adjacent side of the stove above the aperture 4 as shown. The catch releasing mechanism may however be constructed as shown in Fig. 5 of the drawings and in the form of a rod 7 which is disposed a suitable distance above and in parallel relation with the thermal bar 1 and has its ends loosely engaged with apertures 8 formed in the opposite sides of the stove and by means of which the rod is slidably supported. When thus arranged the rod 7 may be connected with the bar 1 in any suitable manner and is here shown as connected with said bar by a short arm or rod 9. It will be noted that the finger 6 of the first form of catch releasing mechanism and the rod 7 of the last described releasing mechanism is slightly longer or projects a slight distance beyond the free end of the thermal bar for a purpose hereinafter described.

Bolted or otherwise secured to the side of the stove through which the ends of the thermal bar and the catch releasing mechanism project, is a channel shaped guide bar 11 having on its outer edges inwardly projecting guide lugs 12 and with which is slidably engaged the catch supporting and cut off operating bar 13. The channel shaped guide bar 11 has formed therein apertures 14 and 15 which register respectively with the apertures 4 and 8 in the side of the stove and through which the free ends of the thermal bar 1 and the finger 6 or rod 7 are projected. It will be noted that the aperture 6ª and the aperture 8 with which the projecting ends of the finger 6 and rod 7 are respectively engaged, are somewhat larger than the aperture 4 with which the free end of the thermal bar is engaged and the end of the finger 6 and the rod 7 which engage these apertures are also preferably larger than the corresponding end of the thermal bar. The purpose of forming the apertures 6ª and 8 larger than the aperture 4 will be hereinafter described.

The catch supporting and cut off operating bar 13 is held in sliding engagement with the guide bar by the lugs 12. On the upper end of the bar 13 is arranged a weight 17 which causes the bar to forcibly drop in the guide bar when the catch carried by said bar is released. The catch for supporting the bar 13 comprises a short bolt or plunger 18 which has a sliding engagement with a guide aperture 19 in a housing or bracket 20 secured to the bar 13 and which has its inner ends slidably engaged with an aperture 21 formed in the bar 13 in line with the aperture 19 in the bracket. The bolt or plunger 18 preferably has its inner end threaded to receive a stop nut 22 between which and the outer side of the housing or bracket 20 is arranged a coiled spring 23 the pressure of which is exerted to yieldingly project the inner end of the bolt through the aperture 21 in the bar 13 and into the aperture 15 in the guide bar 11 which registers with the aperture 6ª or 8 of the finger 6 or rod 7 as the case may be. The inward movement of the catch bolt or plunger 18 by the spring 23 is limited by the stop nut 22 so that the inner end of the bolt projects only far enough to catch into the aperture 15 when brought into alinement therewith by the movement of the bar 13, said bolt by its engagement with the aperture 15 supporting the operating bar 13 in a raised or inoperative position. The outer end of the bolt 18 is preferably provided with a knob 24 whereby the bolt may be manually retracted when the bar 13 is adjusted to an inoperative position.

Secured to the operating bar 13 preferably near the upper end thereof is a bracket 25 to the outer end of which is adjustably connected a bifurcated upper end of a valve operating rod 26 which has an adjustable connection with a curved crank arm 27 secured to the end or stem of the gas controlling valve 29 of the gas supply pipe 30 leading to the burner of the stove. The arrangement of the crank arm 27 and the parts which connect the same with the operating bar 13 is such that when said bar is raised and supported in an inoperative position by the engagement of the catch bolt or plunger 18 with the aperture 15 in the guide bar 11 the valve 29 will be in an open position, and the burner may be lighted. As soon as the flame of the burner heats the thermal bar 1 to a sufficient degree for expanding the latter, the expanding movement thereof will shift the catch releasing finger 6 or rod 7 as the case may be. When the finger 6 or rod 7 is thus shifted the outer ends thereof will be brought into engagement with the inner end of the catch bolt 18 thus forcing the latter out of engagement with the aperture 15 in the guide bar 11 which will permit the operating bar 13 to drop under the pressure of the weight 17 thereon and until the end of the catch bolt or plunger comes into engagement with the adjacent end of the thermal bar, which as will be understood has now been projected by the expansion of the bar. This slight downward movement of the operating bar 13 is very slight and does not materially affect the position of the valve 29 which remains open as long as the operating bar 13 is supported by the catch bolt on the projected end of the expanded thermal bar. If when the parts are in this position the flame of the burner should be blown out or otherwise extinguished without knowledge of the occupants of the house the thermal bar 1 will immediately cool and contract so that the projecting end thereof will be drawn inwardly from beneath the catch bolt 18 whereupon the weighted operating bar 13 will drop. This dropping movement of the bar 13 will through the medium of the link or connecting rod 26 and the crank arm 27 turn off or close the valve 29 thus cutting off further supply of gas to the burner.

By means of the catch and the catch releasing mechanism herein shown and described, it will be seen that in setting the cut off mechanism it is not necessary to wait for the expansion of the thermal bar after the burner is lighted in order to engage the supporting bar or catch bolt therewith and all that is required is to raise the operating bar 13 to a position for turning on the valve, this movement of the bar bringing the catch bolt into position for engaging the aperture 15 in the guide bar 11 and in position to be engaged by the releasing mechanism hereinbefore described. The further action or operation of the parts for bringing the catch mechanism into engagement with the thermal bar and for disengaging the operating mechanism therefrom is entirely automatic and requires no further attention. It will be noted that as the diameter of the catch bolt 18 is larger than that of the aperture 14 in the guide bar 11 through which the end of the thermal bar projects, said catch bolt cannot spring into engagement with said aperture 14 when the thermal bar is contracted and thus prevent or interfere with the operation of the cut off mechanism.

In connection with the automatic cut off mechanism hereinbefore described, I may also provide an alarm or signal which is automatically operated by the movement of the operating bar 13 when the lug is actuated for closing the valve. In the present instance this alarm is shown as a bell 31 having any suitable clapper operating mechanism which is released by a plunger 32 disposed in the path of movement of a signal operating arm 33 carried by the operating bar 16 and which in the present instance is shown as being secured to the bracket 20 of said operating bar so that when the latter is lowered in the manner described, the arm 33 is brought into engagement with the plunger 32 thus releasing the clapper operating mechanism and causing the latter to sound the alarm.

It will be obvious that while the thermal bar is herein shown and described as disposed horizontally above the burner, said bar and the parts connected thereto may be arranged in any suitable position.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, what I claim is:

1. In an automatic thermal cut off of the character described, the combination with a thermal bar, of an automatically operating cut off mechanism adapted to be supported in an inoperative position by said thermal bar when the latter is expanded and to be released when said bar is contracted, a spring projected catch carried by said cut off operating mechanism, means to receive said catch and to thereby support said operating mechanism in an inoperative position until said thermal bar is expanded and a catch releasing finger connected with said thermal bar and adapted to be projected by the latter when expanded and to thereby release said catch and permit the operating mechanism to drop and engage said catch with the expanded thermal bar.

2. In an automatic thermal cut off of the character described, the combination with a thermal bar of an automatically operating cut off mechanism comprising a guide bar having therein apertures one of which is adapted to receive the end of said thermal bar, a cut off operating bar slidably mounted in said guide bar and having therein an aperture adapted to be brought into register with the other aperture in said guide bar, a spring projected catch bolt carried by said operating bar to engage the aperture therein and in said guide bar to support said operating bar in an inoperative position, a catch releasing member connected with said thermal bar and adapted to be projected into engagement with said catch bolt when the thermal bar expands and to thereby release said catch bolt and permit the operating bar to drop and said catch bolt to come into engagement with the expanded thermal bar.

3. In an automatic thermal cut off for burners, the combination with a thermal bar arranged in position to be heated and expanded by the flame of said burner, an automatically operating cut off mechanism comprising a guide bar having therein apertures one of which is adapted to receive one end of the thermal bar, a catch releasing member connected with said thermal bar and having one end engaged with the other apertures in said guide bar, a weight actuated operating bar slidably mounted in said guide bar and having therein an aperture, a spring projected bolt carried by said operating bar and having its end engaged with the aperture in said guide bar whereby said supporting bar is held in an inoperative position and whereby when said thermal bar is expanded, said releasing member will be brought into engagement with said catch bolt thereby releasing the latter and permitting said operating bar to drop and said catch bolt to engage the end of the expanded thermal bar.

In testimony whereof I have hereunto set my hand in presence of two subscribing witnesses.

ANGUS TIBBS.

Witnesses:
 FRED ALRISGER,
 GLENN THOMAS SETTLE.

---

Copies of this patent may be obtained for five cents each, by addressing the "Commissioner of Patents, Washington, D. C."